US012760862B2

(12) United States Patent
Li

(10) Patent No.: US 12,760,862 B2
(45) **Date of Patent: *Oct. 13, 2026**

(54) ARTIFICIAL SUNLIGHT LIGHTING LUMINAIRES FOR INDOOR ENVIRONMENTS

(71) Applicant: Wei Li, Tampere (FI)

(72) Inventor: Wei Li, Tampere (FI)

( * ) Notice: Subject to any disclaimer, the term of this patent is extended or adjusted under 35 U.S.C. 154(b) by 0 days.

This patent is subject to a terminal disclaimer.

(21) Appl. No.: 19/304,831

(22) Filed: Aug. 20, 2025

(65) Prior Publication Data

US 2025/0389405 A1 Dec. 25, 2025

Related U.S. Application Data

(63) Continuation of application No. 18/893,314, filed on Sep. 23, 2024, now Pat. No. 12,416,392.

(30) Foreign Application Priority Data

Sep. 24, 2023 (FI) .................................... 20237160

(51) Int. Cl.

| | |
|---|---|
| ***F21V 9/02*** | (2018.01) |
| ***F21V 3/04*** | (2018.01) |
| ***H05B 45/20*** | (2020.01) |
| ***H05B 47/155*** | (2020.01) |
| ***H05B 47/19*** | (2020.01) |
| *F21Y 113/00* | (2016.01) |

(Continued)

(52) U.S. Cl.

CPC ................ *F21V 9/02* (2013.01); *F21V 3/049* (2013.01); *H05B 45/20* (2020.01); *H05B 47/155* (2020.01); *H05B 47/19* (2020.01); *F21Y 2113/00* (2013.01); *F21Y 2113/13* (2016.08); *F21Y 2115/15* (2016.08)

(58) Field of Classification Search

CPC ........... F21V 9/02; F21V 3/049; H05B 45/20; H05B 47/155; H05B 47/19

USPC ........................................................ 362/231

See application file for complete search history.

(56) References Cited

U.S. PATENT DOCUMENTS 11,662,079 B1 5/2023 Parker et al.
2013/0294045 A1* 11/2013 Morgenbrod ........... F21V 5/045 362/1

(Continued)

*Primary Examiner* — Thomas M Sember

(74) *Attorney, Agent, or Firm* — Christopher B. Kilner; MILLEN, WHITE, ZELANO & BRANIGAN, P.C.

(57) ABSTRACT

A lighting system and luminaire replicates attributes of natural sunlight and the sky. An array of light emitters capable of emitting light closely mimicking natural sunlight. This emitted light features an adjustable correlated color temperature (CCT) that spans from 1900 K to 6500 K, faithfully reproducing the Sun's appearance across different times of the day. To ensure precision in spectral matching, the system operates within a defined wavelength range of 400 nm to 1400 nm. At least one light emitter with a wavelength within the range of 760 nm to 1400 nm is incorporated to guarantee accurate representation. A luminaire equipped with a panel interacts with the multitude of light emitters, proficiently emitting color-tunable light and simulating diverse sky scenes. To facilitate control and customization, a dedicated control system is seamlessly integrated into the luminaire, enabling precise adjustment of the correlated color temperature and spectral power distribution.

20 Claims, 11 Drawing Sheets

(51) Int. Cl.
*F21Y 113/13* (2016.01)
*F21Y 115/15* (2016.01)

(56) References Cited

U.S. PATENT DOCUMENTS

| | | | | |
|---|---|---|---|---|
| 2014/0176179 | A1* | 6/2014 | Minami | H02S 50/10 362/2 |
| 2017/0257925 | A1 | 9/2017 | Forbis et al. | |
| 2022/0252233 | A1 | 8/2022 | Li | |
| 2022/0353972 | A1 | 11/2022 | Heerink | |

* cited by examiner

ARTIFICIAL SUNLIGHT LIGHTING LUMINAIRES FOR INDOOR ENVIRONMENTS

FIELD OF THE INVENTION

The present invention pertains to the field of lighting luminaires designed to faithfully replicate the visual and spectral qualities of sun and the sky within indoor spaces. Specifically, the invention encompasses a lighting system and luminaire engineered to closely mimic the appearance and spectral characteristics of the Sun and Sky throughout the day.

BACKGROUND TO THE INVENTION

Contemporary indoor environments often lack access to natural sunlight and the dynamic visual and spectral experiences it provides. This deficiency can have adverse effects on human health and well-being, leading to a demand for lighting systems capable of reproducing the Sun's and Sky's visual and non-visual effects.

PURPOSE OF THE INVENTION

The present invention addresses this need by introducing a lighting system and luminaire designed to simulate the visual and spectral qualities of the Sun and Sky, enhancing the indoor environment's health benefits.

DESCRIPTION OF THE INVENTION

This innovation utilizes a multitude of light emitters arranged to emit light closely resembling natural sunlight. The emitted light has an adjustable correlated color temperature (CCT) spanning from 1900 K to 6500 K, replicating the Sun's appearance at different times of the day.

To achieve accuracy in spectral matching, the lighting system operates within a limited wavelength range of 400 nm to 1400 nm, emulating the Sun's spectral output. Furthermore, at least one light emitter with a wavelength falling within the range of 760 nm to 1400 nm is integrated into the system to ensure faithful representation.

The invention also includes a luminaire equipped with a panel that interacts with the plurality of light emitters. This panel is adept at emitting color-tunable light and simulating a variety of sky scenes, effectively expanding the lighting system's capabilities to encompass the Sky's appearance.

To facilitate control and customization, a dedicated control system is integrated into the luminaire, enabling precise adjustment of the correlated color temperature and spectral power distribution. This control system provides the capability to replicate the appearance and spectrum of the Sun and Sky throughout the day.

Additionally, to cater to user preferences and specific indoor environments, the luminaire is equipped with a user interface for adjusting its settings. This user-friendly interface ensures that the lighting experience can be tailored to meet individual needs.

BRIEF DESCRIPTION OF THE FIGURES

Further aspects and embodiments of the invention are detailed in the accompanying drawings and subsequent description. These aspects and embodiments are illustrative and not limiting, representing various potential applications of the invention.

DETAILED DESCRIPTION OF THE INVENTION

Reference will now be made in detail to specific embodiments of the present invention. Examples of these embodiments are illustrated in the accompanying drawings. Numerous specific details are set forth to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments provide lighting systems to provide simulated natural sunlight in rooms, offices, and other indoor locations. As natural sunlight is essential for human beings and provides important benefits to human physical and mental health, indoor lighting systems according to the disclosed embodiments are crucial for those who do not go outdoors much due to their work or lifestyle, or those who live in regions where the day is shorter or the climate does not provide enough sunlight. According to the disclosed embodiment, the color temperature and intensity of the lighting system's light may vary based on the time of day or year and the geographic locations according to settings selected by users. For example, a user may program the lighting system to function like natural sunlight in a tropical place, even if they actually live at a high-latitude location.

In addition, the lighting systems and luminaires according to the disclosed embodiments are capable of reproducing natural light without emitting harmful ultraviolet radiation. They can simulate a sunny sky scene throughout the day, encompassing both visual and non-visual effects. This capability allows users to perceive sunny sky scenes indoors, fostering a sense of connection to nature, happiness, and overall well-being.

Figure 1:
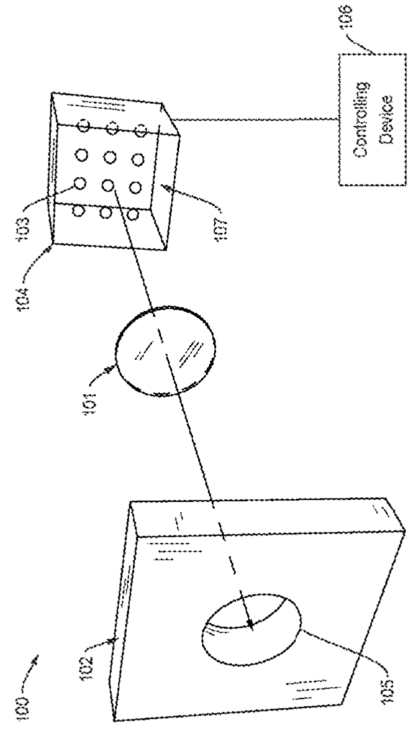
FIG. 1 depicts a schematic representation of a exemplary lighting system as described in the disclosed embodiments.

FIG. 1 presents an exemplary lighting system aligned with the disclosed embodiments. Within FIG. 1, the lighting system denoted as 100 encompasses a color-tunable light-emitting panel, numbered 102, designed to emulate a sky, a tunable white light engine, designated as 104, simulating a sun, and a control device denoted as 106, which oversees the regulation of both the light engine 104 and the light-emitting panel 102. The color-tunable light-emitting panel 102 may take the form of either an edge-lit or back-lit panel, or even an Organic Light Emitting Diodes (OLEDs) panel. Within the light engine 104, there is a minimum of one light source 103, consisting of an array of light-emitting diodes (LEDs) thoughtfully arranged within an optical cavity 107 contained within the light engine 104.

Additionally, the lighting system 100 includes an optical element 101, strategically positioned in front of the light engine 104. The color-tunable light-emitting panel 102, whether edge-lit or back-lit, features an aperture 105. The tunable white light engine 104 can be attached to or inserted into this aperture 105.

The control device 106 serves as the central coordinator for the light emitters, ensuring the creation of the desired color, intensity, and pattern to effectively replicate the characteristics of sunlight at any given time of day or year.

As depicted in FIG. 1, the light emitting panel 102, light engine 104, optical element 101, and controlling device 106 are presented as distinct components. However, it's important to note that the disclosed embodiments are not confined to this specific configuration. For instance, the light engine 104 could be positioned inside the aperture 105 of the light emitting panel 102 or mounted around it. It's also possible for the light engine 104 and controlling device 106 to be integrated into a single unit. Furthermore, a single diffuser, such as optical element 101, might be incorporated directly on the top surface of the light emitting panel 102.

Moreover, the controlling device 106 can be a separate entity, capable of wireless and remote connectivity with both the light engine 104 and light emitting panel 102, without being an integral part of the lighting system 100. Essentially, any combination of these elements that forms a lighting system and luminaire with the ability to replicate natural light and simulate sunny sky scenes throughout the day, encompassing both visual and non-visual effects, falls under the purview of the disclosed embodiments.

Figure 2:
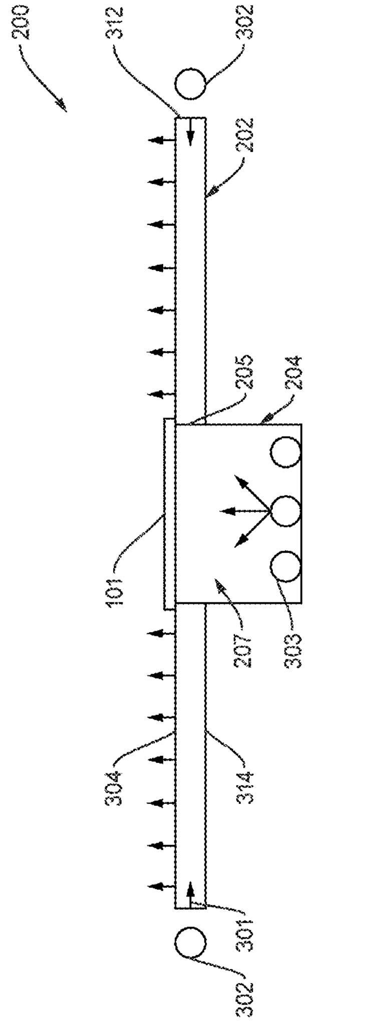
FIG. 2 provides a cross-sectional perspective of a lighting system, as per the disclosed embodiments, wherein an edge-lit panel serves as the color-tunable light emitting panel.

FIG. 2 presents a cross-sectional view of lighting system 200, as outlined in the disclosed embodiments. In this configuration, color-tunable light emitting panel 202 is designed as an edge-lit panel. Within FIG. 2, the tunable white light engine 204 is equipped with a tunable white light source 303, offering adjustable Correlated Color Temperature (CCT) to effectively replicate direct sunlight throughout the day.

The tunable light source is engineered using multiple controllable channels of white LEDs to precisely regulate the color temperature of the white light output within a range spanning from 1900 K to 6500 K. These channels in a tunable white light source may all emit white light but with varying color temperatures, or in combination with one channel of amber LEDs. The tunable light source 303 can be constructed from various combinations of multi-channel colored LEDs.

In one embodiment, a 2-channel white LED array is employed within light engine 204. Such a two-color LED array comprises numerous LEDs of a first color temperature (warm white) and multiple LEDs of a second color temperature (cool white). The white LEDs in the first channel emit white light with a color temperature of approximately 2700K, remaining within five MacAdams ellipses of the Black Body Curve. In the second channel, the white LEDs emit white light with a color temperature of approximately 6500K, also within five MacAdams ellipses of the Black Body Curve.

In another embodiment, a 3-channel (three-color LED array) configuration is used. This includes an array of greenish-white LEDs with a peak wavelength around 550 nm (which may vary from about 505 nm to about 550 nm), several cool white LEDs featuring a color temperature of approximately 6500K within five MacAdams ellipses of the Black Body Curve, and a third group of amber LEDs with a peak wavelength of about 625 nm added to the mix, thus expanding the gamut sufficiently to encompass the Black Body Curve over the desired range.

Tunable white light engine 204 is integrated into aperture 205 from the rear side of light emitting panel 202, while optical element 101 is affixed to the front surface of light engine 204, serving as the light-emitting surface. Within the light engine 204's optical cavity 207, multiple controllable channels of white LEDs from tunable white light source 303 are positioned to emit light towards the light-emitting surface 101.

Given that the color-tunable light emitting panel 202 is designed in an edge-lit style, it incorporates a multitude of LEDs 302 positioned along the edges of a light guide 301. These LEDs 302 function as light sources for the color-tunable light emitting panel 202. Additionally, the color-tunable light emitting panel 202 includes a light output window, denoted as light out-coupling structures 304, on its front (or top) side, a light input window 312 adjacent to the LEDs 302, and a reflective surface or reflector 314 on its rear (or bottom) side.

The light guide receives light emitted by the plurality of LEDs 302 via the light input window 312, and this light propagates in guided mode within the guide 301. The plurality of LEDs 302 may consist of, for example, a linear stripe of color-tunable RGB or RGBA or RGBW LEDs. These LEDs 302 can be individually adjusted in output to create the desired color, intensity, and pattern. The light guide can be constructed from light-transmitting materials such as glass, silicone, or polycarbonate (PC).

The out-coupling structure, also known as the light output window 304, may have a rough surface or can be formed by applying diffusely reflective paint onto the surface of the light guide 301. This allows for the uniform distribution of light received from the light guide 301 along the surface of the light output window 304. In an alternative configuration, the surface of the light output window 304 may be adorned with surface microstructures, such as dot patterns, designed to diffuse the light emitted from the light guide 301.

In another alternative embodiment, the out-coupling structure 304, combined with the reflector 314, can be implemented on the rear surface of the light guide 301. In this scenario, the lighting system 200 includes an additional diffusing film attached to the front surface of the color-tunable light emitting panel 202.

In yet another alternative embodiment, a linear stripe of color-tunable RGB or RGBA or RGBW LEDs may be positioned adjacent to the tunable white light engine 204, affixed to an inner edge of the light guide 301.

Furthermore, the color-tunable light emitting panel 202 may be constructed using OLED (organic LED) technology. An OLED panel has the capability to generate diffused light with controlled color, intensity, and pattern.

Figure 3:
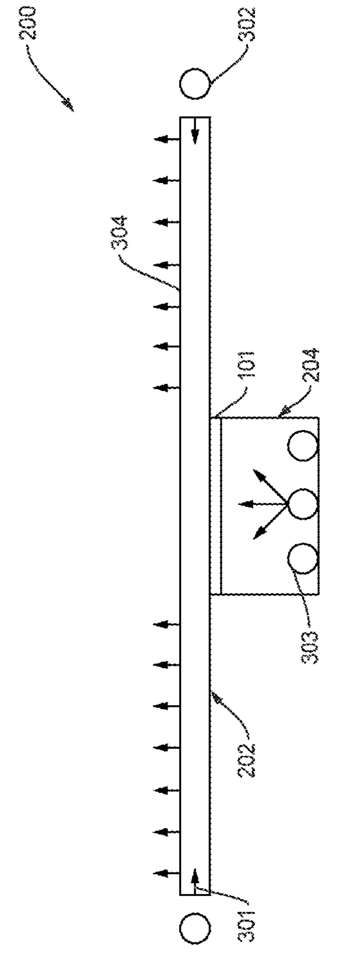
FIG. 3 presents a cross-sectional perspective of an alternative embodiment of the lighting system shown in FIG. 2.
Figure 4:
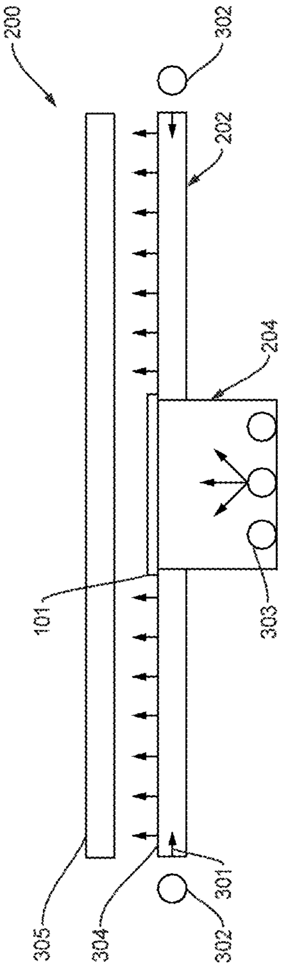
FIG. 4 showcases another alternative embodiment of the lighting system as described in the disclosed embodiments.

FIGS. 3-4 depict alternative configurations of lighting system 200 as presented in FIG. 2, featuring an edge-lit color-tunable light emitting panel 202. In FIG. 2, the tunable white light engine 204 is inserted into the aperture 205 on the rear surface of the color-tunable light emitting panel 202. However, in FIG. 3, the tunable white light engine 204, accompanied by an optical element 101, is positioned behind the light guide 301. In this arrangement, a smooth surface region on the rear side of the light guide 303 faces the tunable white light source 303.

FIG. 4 presents an alternative embodiment of lighting system 200. According to the disclosed embodiments, a single diffuser 305 is positioned adjacent to the front surface of the color-tunable light emitting panel 202. This diffuser 305 serves both the light engine 204 and the light emitting panel 202 by diffusing the light emitted from the light source 302 of the light emitting panel 202 and the light emitted from the light source 303 of the light engine 204. It's worth noting that the use of optical element 101 may be optional in this alternative embodiment.

Diffuser 305 can take the form of a volumetric element, or its surface may be textured or coated with a diffusely reflective paint to scatter the light, achieving a diffuse illumination effect. The surface corresponding to the light guide 301 may also feature surface microstructures, such as dot patterns, to scatter the light received from the light guide 301.

Additionally, diffuser 305 can also function as an optical element 101. Consequently, the surface of diffuser 305 that corresponds to the light engine 204 may incorporate similar microstructures as those found in optical element 101, as illustrated in FIG. 2, effectively simulating natural sunlight.

The specific structure of diffuser 305 outlined above is provided for illustrative purposes and is not limited to those details. Any combinations of microstructures and materials capable of achieving the light-diffusing functions described in the disclosed embodiments fall within the scope of the present invention.

Figure 5:
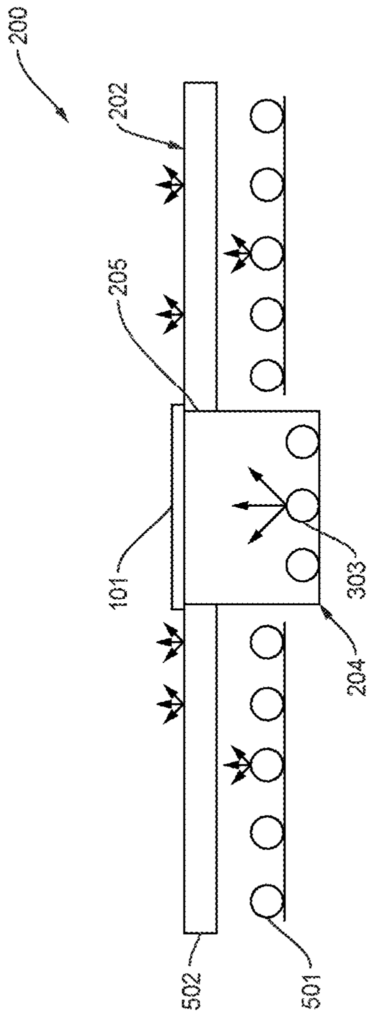
FIG. 5 presents a cross-sectional view of a lighting system in accordance with another alternative embodiment, featuring a back-lit-type color-tunable light-emitting panel.

FIG. 5 presents a cross-sectional view of lighting system 200, demonstrating alternative embodiments. In this illustration, color-tunable light emitting panel 202 adopts a back-lit style configuration. Positioned behind it are multiple LEDs 501, which may include RGB, RGBA, or RGBW LEDs. These LEDs are arranged in conjunction with a diffuser 502, which serves as the light emitting surface. Unlike edge-lit panels, the back-lit style eliminates the need for a light guide within the light emitting panel.

Tunable white light engine 204, featuring optical element 101 on its front side, is inserted into aperture 205. The tunable white light engine 204 and optical element 101 share the same functions and structures as those depicted in FIG. 2. Therefore, detailed descriptions of these elements are omitted for brevity.

The purpose of diffuser 502 is twofold: it facilitates uniform light emission and prevents the visibility of hot spots to viewers. While the attributes of diffuser 502 have been mentioned earlier, a detailed description is omitted here for conciseness.

Figure 6:
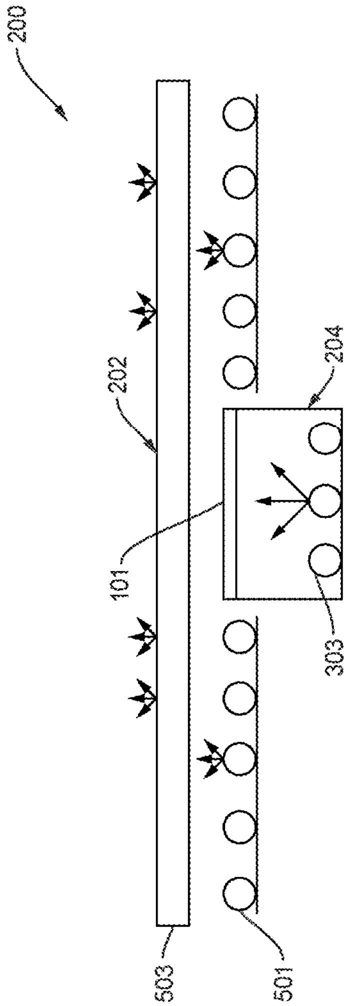
FIG. 6 depicts a cross-sectional view of an alternative embodiment of the lighting system shown in FIG. 5.

Moving to FIG. 6, lighting system 200 bears resemblance to that of FIG. 5. However, it introduces a single diffuser 503 that caters to both the color-tunable light emitting panel 202 and the tunable white light engine 204. The characteristics of this single diffuser 503 mirror those of diffuser 305 in FIG. 4. Thus, a comprehensive description of diffuser 503 is omitted in the interest of brevity.

Figure 7:
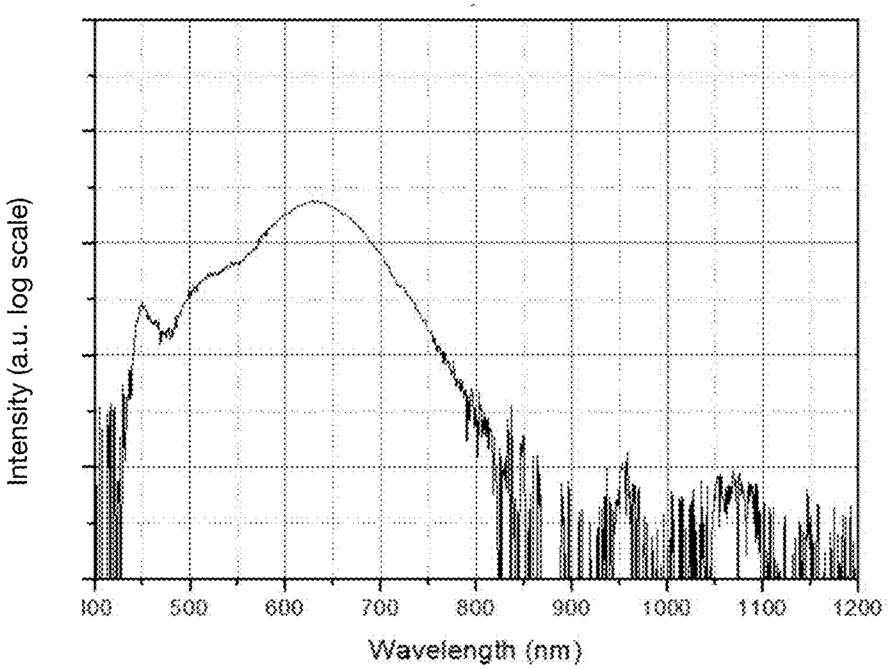
FIG. 7 shows a plot representing an example spectral profile for a tunable white-light light emitting diode (LED) light source.

As depicted in FIG. 7, offering an illustrative spectral profile of a white-light light emitting diode (LED), scientific findings underline the advantageous effects of sunlight on human productivity, well-being, and overall health. Consequently, achieving a spectral output encompassing the wavelength range from 400 nm to 1400 nm is highly desirable. Such a broad wavelength coverage not only replicates the health-promoting attributes of natural sunlight but also eliminates harmful UV radiation, thus safeguarding user well-being."

Figure 8:
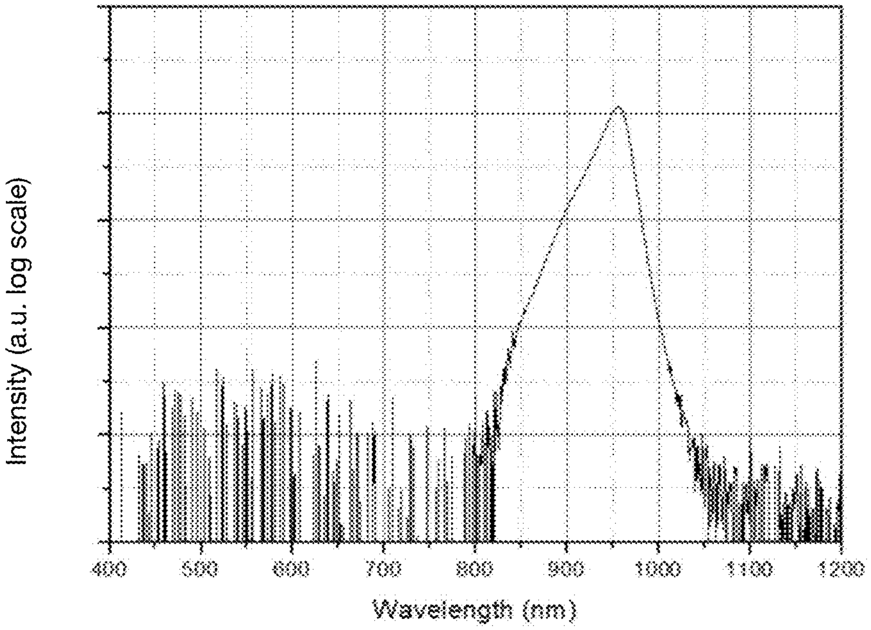
FIG. 8 presents a plot depicting an example spectral profile for an infrared light-emitting diode (LED).

A representative spectral profile of an infrared (IR) light emitting diode (LED) operating at a central wavelength of approximately 940 nanometers (nm) is presented in FIG. 8. This spectral illustration serves to depict the emission characteristics of the IR LED within the near-infrared spectrum, which is utilized to simulate a portion of the sunlight spectrum. Notably, the profile showcases a prominent emission curve centered around the 940 nm wavelength, signifying the LED's ability to emit radiant energy with peak intensity in this specific wavelength range. This emission profile underscores the IR LED's suitability for generating precise IR wavelengths, thereby contributing to the faithful replication of a selected segment of the sunlight spectrum. Such capabilities are instrumental in applications where the emulation of sunlight spectral components is vital, including those related to indoor lighting systems designed to mimic natural light.

Figure 9:
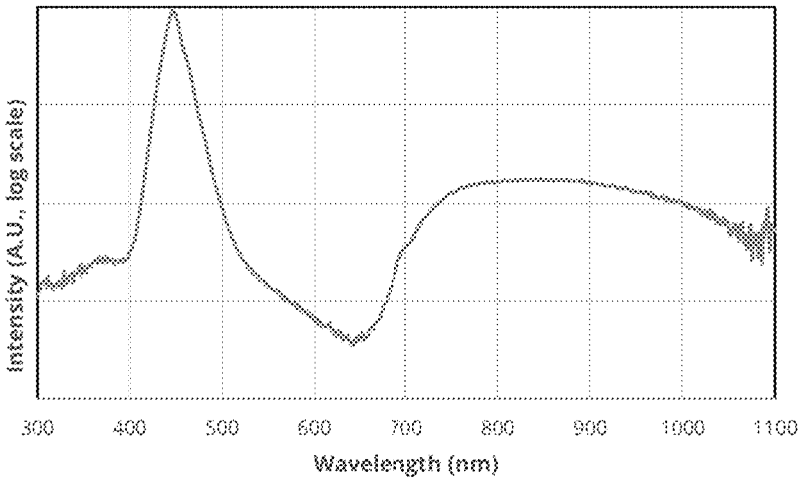
FIG. 9 displays a plot illustrating the typical normalized power versus wavelength for a broadband infrared emitter.

An exemplary spectral profile, as depicted in FIG. 9, delineates the outstanding features of a continuous broadband infrared (IR) emitter. This profile underscores its impressive capabilities in delivering a seamless spectrum of IR emissions, extending from 650 to 1100 nanometers (nm), while maintaining exceptional light output characteristics. Across this expansive wavelength range, the emitter consistently and efficiently emits radiant energy, showcasing its proficiency in generating IR radiation with noteworthy intensity and precision. This spectral profile serves as compelling evidence of the broadband IR emitter's adeptness in faithfully reproducing a significant segment of the sunlight spectrum. Encompassing critical IR wavelengths essential for replicating specific spectral elements inherent to natural sunlight, this broad emission range is of paramount significance. Consequently, this emitter assumes substantial importance in applications where the faithful recreation of sunlight's spectral attributes is imperative, particularly in advanced indoor lighting systems designed to mimic the nuanced qualities of natural light.

Figure 10:
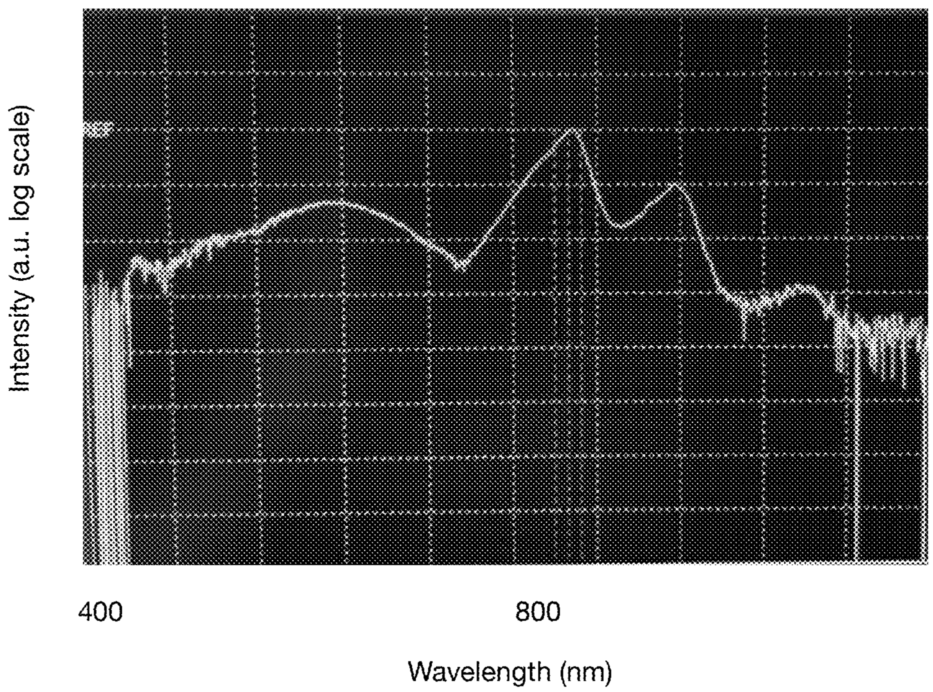
FIG. 10 showcases a plot depicting the typical normalized power versus wavelength for an artificial sunlight luminaire.

The heart of the innovative lighting system, as illustrated in FIG. 10, lies in its spectral profile, a key aspect of the technology presented herein. This meticulously engineered system is designed with the utmost care to faithfully replicate the entire spectrum of natural sunlight, spanning from 400 nm to 1100 nm. At its core, this system features a continuous white LED light source emitting within the range of 400 nm to 700 nm, effectively encompassing the complete visible spectrum and faithfully reproducing the radiant qualities of natural sunlight. In addition to this, the system seamlessly integrates three strategically positioned infrared LEDs, operating within the spectral range of 650 nm to 1100 nm. These constituent elements work harmoniously to generate a broadband emission characterized by superior light output attributes. Within this extensive wavelength range, the lighting system consistently and efficiently emits radiant energy, delivering unrivaled intensity and precision. This exemplary spectral profile serves as compelling evidence of the system's exceptional ability to faithfully replicate a substantial portion of the sunlight spectrum. Its adaptability and precision render it an indispensable asset across a multitude of applications where the faithful recreation of natural light's spectral characteristics is of paramount importance. Whether deployed in indoor environments or advanced lighting systems, this innovation excels in emulating the nuanced attributes of natural light, thereby reshaping the quality of illuminated spaces.

Figure 11:
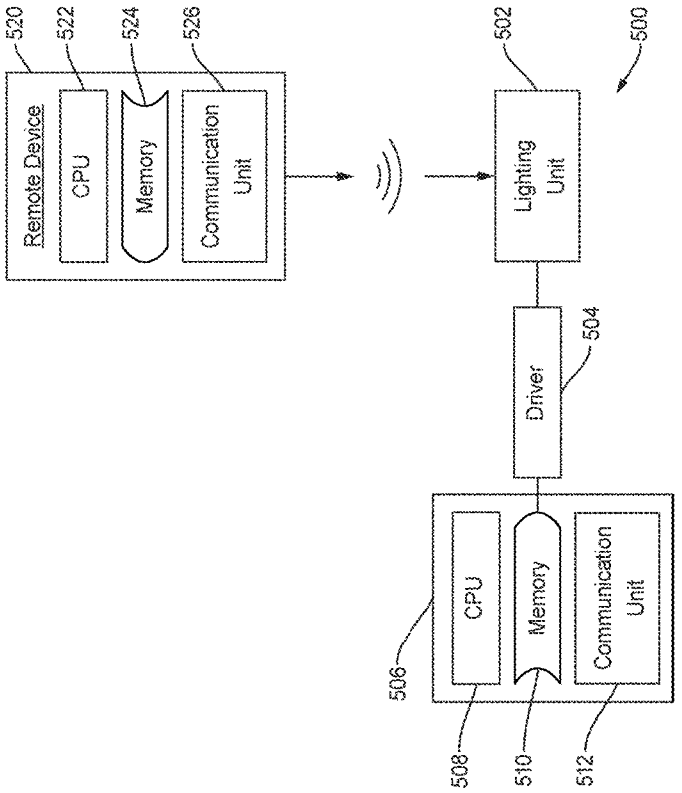
FIG. 11 presents a schematic diagram of an LED luminaire in accordance with the disclosed embodiments.

FIG. 11 presents a schematic diagram of an LED luminaire 500, a central component of the disclosed embodiments. This innovative LED luminaire boasts the capability of establishing wireless communications with remote devices, exemplified here by remote device 520.

In accordance with the disclosed embodiments, LED luminaire 500 encompasses a lighting unit 502, which comprises LED-based light-emitting elements, including variations such as lighting systems 200 or light engines 204 as elucidated in FIGS. 2-6. Augmenting this core is an LED driver 504, responsible for energizing light engine 204 to dispense light and connect to a branch circuit (not depicted). A pivotal element is the controlling device 506, encompassing a CPU 508, which could be a microprocessor or microcontroller. It also incorporates a memory 510, adept at housing data and software that the CPU 508 executes. This software assumes the critical role of regulating the operations of light unit 502. The configuration is further fortified with a communication unit 512, engineered to both emit and capture signals, forging connections with remote devices like remote device 520.

Controlling device 506 itself can take the form of an embedded computing device, augmented with intrinsic wired or wireless communications capabilities. This embedded computing device manifests in various incarnations, potentially serving as a dedicated computer or processor. Its primary function entails assimilating input from a wired or wireless module and then issuing control signals to other modules and the driver.

Conversely, remote device 520 emerges as a versatile counterpart, spanning personal computers, smartphones, and similar entities. This device is endowed with a CPU 522 and a memory 524, where executable software resides, facilitating the regulation of remote device 520's operations. Additionally, a communication unit 526 stands ready, facilitating seamless interaction with the communication unit 512 of controlling device 506. This bidirectional communication empowers remote device 520 to issue commands to controlling device 506. These commands range from the elementary, such as turning LED luminaire 500 on or off, to the sophisticated, such as altering the time zone or regions represented by LED luminaire 500. Remote device 520 can also harness these communications to acquire various shades of natural sunlight, each characterized by distinct colors and temperatures, in line with user preferences and specific requirements.

As appreciated by those skilled in the art, the present invention can manifest in multiple embodiments, including a system, method, or computer program product. These embodiments encompass entirely hardware-based configurations, entirely software-based implementations (comprising firmware, resident software, microcode, etc.), or hybrid embodiments that amalgamate software and hardware elements, generically referred to as a "circuit," "module," or "system" herein. Furthermore, this innovation can exist as a computer program product, residing in any tangible medium of expression possessing computer-usable program code.

In practice, various computer-usable or computer-readable media may find application, including electronic, magnetic, optical, electromagnetic, infrared, or semiconductor systems, devices, apparatuses, or propagation mediums. Exemplary media comprise electrical connections with one or more wires, portable computer diskettes, hard disks, random access memory (RAM), read-only memory (ROM), erasable programmable read-only memory (EPROM or Flash memory), optical fibers, portable compact disc read-only memory (CD-ROM), optical storage devices, transmission media supporting the Internet or an intranet, or magnetic storage devices. Notably, the computer-usable or computer-readable medium might even include paper or another suitable substrate onto which the program is printed. These tangible forms facilitate the electronic capture of the program, for instance through optical scanning, and subsequent compilation, interpretation, or processing, as needed, followed by storage in a computer memory.

Computer program code tasked with executing the operations of the present invention can be composed in a variety of programming languages. This span encompasses object-oriented languages such as Java, Smalltalk, C++, or similar choices and conventional procedural languages like the "C" programming language and its analogs. The program code can execute exclusively on a user's computer, partially on a user's computer, serve as a stand-alone software package, partially run on the user's computer and partially on a remote computer, or operate entirely on a remote computer or server. In this latter scenario, the remote computer may connect with the user's computer via various networks, encompassing local area networks (LANs) or wide area networks (WANs), or through external computers, such as via the Internet facilitated by an Internet Service Provider.

It is vital to underscore that the terms "comprises" and "comprising," when employed in this context, specify the presence of declared features, integers, steps, operations, elements, and/or components, but do not preclude the inclusion or addition of one or more other features, integers, steps, operations, elements, components, and/or groups thereof. In summary, embodiments might materialize as a computer process, a computing system, or an article of manufacture, such as a computer program product on computer-readable media. This computer program product could be a computer storage medium, readable by a computing system, and encoding program instructions for executing a computer process. Once accessed, these instructions instruct a processor to facilitate the functionalities disclosed herein.

Finally, it should be understood that the structure, materials, acts, and equivalents of all elements referred to as "means" or "steps" in the claims below encompass any structure, material, or act to perform the specified function, either in conjunction with other claimed elements or as stand-alone entities. This description, while comprehensive, is intended for illustrative and explanatory purposes and does not exhaustively detail all possible modifications or variations. Modifications and variations apparent to those of ordinary skill in the art, without straying from the essence and scope of the invention, are deemed to fall within the appended claims.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding Finnish application No. 20237160, filed Sep. 24, 2023, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A luminaire, comprising:

a visible-light engine comprising a plurality of channels, each channel configured to emit white light at a predetermined correlated color temperature (CCT) within about 1900 K-6500 K;

at least one near-infrared light source emitting radiation in a near-infrared region; and a controller configured to dynamically mix outputs of the visible-light engine and the near-infrared light source to emulate a spectral power distribution and intensity characteristic of natural sunlight.

2. The lighting luminaire of claim 1, wherein each channel has a distinct CCT within about 1900 K to about 6500 K.

3. The lighting luminaire of claim 1, wherein the controller is configured to coordinate the outputs of the visible-light engine and the near-infrared light source to emulate a spectrum and intensity of natural sunlight, based on a predetermined schedule or in response to control signals.

4. The lighting luminaire of claim 1, wherein the controller is a separate element that can be wirelessly and remotely connected with the lighting luminaire.

5. The lighting luminaire of claim 1, further comprising a wireless communication module for connecting the lighting luminaire to a network and enabling remote control via a mobile device or computer.

6. The lighting luminaire of claim 1, further comprising a color-tunable light emitting panel (202), integrally coupled to the luminaire, configured to emit light having a selected color or pattern.

7. The lighting luminaire of claim 1, further comprising a diffuser (101) disposed in front of the visible-light engine and the near-infrared light source, the diffuser being configured to homogenize a combined visible and infrared output of the visible-light engine and the near-infrared light source.

8. The lighting luminaire of claim 1, wherein the controller (506) is further configured to execute a diurnal lighting protocol comprising distinct sunrise, midday, and sunset timeframes, each timeframe defining different relative drive levels for the tunable white light source channels and a near-infrared channel to emulate the spectral power distribution and intensity changes of natural sunlight over a day.

9. A lighting luminaire, comprising:

a tunable white light source channel configured to emit visible light with an emission spectrum within about 400 nm to about 700 nm, the channel having a correlated color temperature (CCT) tunable within about 1900 K to about 6500 K;

a near-infrared channel comprising at least one infrared light emitter (103) configured to emit radiation in a near-infrared region; and a controller (506) configured to coordinate the light output of both the tunable white light source channel and the near-infrared channel, over time and in accordance with a predetermined schedule or in response to control signals, to emulate a spectral power distribution and illuminance characteristic of natural sunlight.

10. The lighting luminaire of claim 9, further comprising a wireless communication module for connecting the lighting luminaire to a network to enable remote control.

11. The lighting luminaire of claim 9, wherein the tunable white light source channel comprises a plurality of source channels, each source channel comprising at least one white visible light emitter, and each source channel emits visible light at a distinct CCT.

12. The lighting luminaire of claim 9, wherein the control signals comprise one or more of signals generated by a predetermined schedule stored in the controller (506); and signals received by the control device (506) from a remote device via a wireless communication module.

13. The lighting luminaire of claim 9, further comprising a color-tunable light emitting panel (202) integrally coupled to the luminaire, wherein the panel is configured to emit light having a selected color or pattern.

14. A method of operating a lighting luminaire to emulate natural sunlight, the method comprising:

varying, by a controller (506), a drive signal to a tunable white light source channel of the luminaire to emit visible light with a correlated color temperature (CCT) tunable within about 1900 K to about 6500 K;

driving, by the controller, one or more near-infrared light emitters to emit radiation in a near-infrared region;

coordinating, by the controller, the drive signals to the tunable white light source channel and the near-infrared light emitters over time; and causing a combined spectral power distribution and illuminance to approximate those of natural sunlight, based on a predetermined schedule or in response to control signals.

15. The method of claim 14, wherein the control signals comprise one or more of:

signals generated in accordance with the predetermined schedule stored in the controller (506); and signals received by the controller (506) from a remote device via a wireless communication module.

16. The method of claim 14, wherein the control signals include user inputs received via a mobile application or a touch-screen interface.

17. The method of claim 14, further comprising integrally coupling a color-tunable light emitting panel to the luminaire, the panel being selected from an edge-lit panel, a back-lit panel, or an OLED panel configured to simulate sky scenes.

18. The method of claim 14, further comprising operatively coupling the controller to a wireless communication interface configured to receive user commands from a remote device.

19. The method of claim 14, further comprising receiving, by the controller (506), scheduling data from a remote device (520), the scheduling data defining time-based variations in spectral output and illuminance to emulate natural sunlight.

20. The method of claim 14, wherein the controller (506) is configured to store and execute user-defined sunlight profiles received from a remote device (520), each profile specifying correlated color temperature and infrared output over time.

* * * * *